United States Patent [19]

Hollis

[11] 4,284,543

[45] Aug. 18, 1981

[54] EXTENDING THE MOLTEN STABILITY OF POLY (ETHYLENE-VINYL ACETATE) HOT-MELT ADHESIVES BY ADDITION OF LITHIUM METAL ION

[75] Inventor: Samuel D. Hollis, Savannah, Ga.

[73] Assignee: Union Camp Corporation, Wayne, N.J.

[21] Appl. No.: 183,354

[22] Filed: Sep. 2, 1980

[51] Int. Cl.$^3$ ...................... C08L 23/26; C08L 31/04
[52] U.S. Cl. ............................ 260/27 EV; 525/195; 525/222; 260/45.95 R; 260/45.8 NT; 260/45.7 R
[58] Field of Search ................. 525/195, 222; 260/27 EV, 45.95, 45.8 NT, 45.7 R

[56] References Cited

U.S. PATENT DOCUMENTS

| 3,468,978 | 9/1969 | Battersby | 260/897 |
| 3,560,420 | 2/1971 | Tamura et al. | 260/25 |

Primary Examiner—Carman J. Seccuro
Attorney, Agent, or Firm—Kane, Dalsimer, Kane, Sullivan and Kurucz

[57] ABSTRACT

The disclosure is of a method for extending the molten stability of hydrocarbon resin tackified ethylene-vinyl acetate (EVAc) copolymers. One embodiment of the method comprises mixing a lithium salt in the adhesive compositions. The disclosure is also of EVAc-based hot-melt adhesive compositions prepared by the method of the invention and characterized in part by their stability in the molten state.

9 Claims, No Drawings

EXTENDING THE MOLTEN STABILITY OF POLY (ETHYLENE-VINYL ACETATE) HOT-MELT ADHESIVES BY ADDITION OF LITHIUM METAL ION

BACKGROUND OF THE INVENTION

1. Field of the Invention

The invention relates to ethylene-vinyl acetate copolymer (hereinafter referred to as EVAc) hot-melt adhesives and more particularly relates to such adhesives having extended molten stability and to methods of their preparation.

2. Brief Description of the Prior Art

EVAc-based hot-melt adhesives, their preparation and methods of use are well known in the art; see for example U.S. Pat. No. 3,560,420. These adhesives compositions are used extensively in packaging, laminating and bookbinding. However, their use in typical application apparatus is impaired by the tendency of these hot-melt adhesive compositions to exhibit relatively short pot-lives; i.e.; fluid stability under molten conditions. Generally viscosity increases or gelation and a "skinning" over of air exposed surfaces occurs within relatively short periods of time after initial melting. Almost all EVAc adhesives contain a thermoplastic, modifying resin as a major component which is known as a tackifier. Tackifiers increase the adhesion and lower the viscosity of hot-melt adhesives. The improvement in adhesion is believed to be a result of improved wetting.

Hot melt EVAc adhesives tackified with hydrocarbon resins as the modifying resin are subject to degradation due to oxidation while being maintained in the molten state. Such oxidation frequently causes a dispersion of insoluble gel particles to develop with or without a large change in adhesive viscosity. The dispersed particles clog filter screens and ultimately proceed to a condition where the adhesive gels, clogs the applicator equipment or loses much of its expected strength properties. It is necessary to stabilize these adhesives against oxidation by incorporating into them an oxidation inhibitor such as butylated hydroxy toluene (BHT). A given inhibitor alone may not stabilize an EVAc hot melt adhesive tackified with hydrocarbon resin. It may be necessary to increase the level of antioxidant initially selected, to a higher level as testing reveals that the stability obtained is inadequate. Or it may be necessary to add a different type of antioxidant. A vast number of antioxidants are available and their effects are often synergistic. This subject is well reviewed under the heading "Antioxidants and Antiozonants" by P. O. Nicholas, et al in Volume 3, Third Edition of the Kirk-Othmer Encyclopedia of Chemical Technology.

I have discovered that the presence of soluble lithium ions in hydrocarbon resin tackified hot-melt EVAc adhesive compositions retards the oxidative degradation process. This effect is unexpected because lithium compounds are not generally recognized as antioxidants and in fact they do not retard oxidation, as described above, to the maximum degree in the absence of a conventional anti-oxidant.

The method of the invention is advantageous in that it significantly increases the hot melt stability of EVAc-based hot-melt adhesives containing hydrocarbon resins as a tackifier. This permits an operator to employ apparatus with a greater time latitude and to melt the adhesive compositions well in advance of its application. This provides more flexibility in use of the adhesives.

SUMMARY OF THE INVENTION

The invention comprises a method of increasing the molten stability of hydrocarbon resin tackified, EVAc-based, hot-melt adhesive compositions which comprises; mixing with said compositions a stabilizing proportion of a soluble lithium metal ion.

The invention also comprises hydrocarbon resin tackified, EVAc-based, hot-melt adhesive compositions which include lithium metal ion as an ingredient.

DETAILED DESCRIPTION OF THE PREFERRED EMBODIMENTS OF THE INVENTION

The method of the invention will advantageously extend the molten service life of any EVAc-based hot-melt adhesive which incorporates a tackifying hydrocarbon resin. These tackifiers and EVAc-based hot-melt compositions incorporating them are well known in the art as are methods of their preparation; see for example U.S. Pat. No. 3,657,171.

Hydrocarbon resin tackifiers are now mostly produced by polymerization of a mixture of monomers obtained from deep cracking of petroleum. Such monomers are, for example, cyclopentadiene, mixtures of cis and trans 1,3-pentadiene, vinyltoluene, a-methylstyrene, styrene, and indene. A wide variety of monomer mixtures are used and are polymerized by means of acid catalysts such as acid treated clay, aluminum trichloride, sulphuric acid or boron trifluoride to produce resins which may broadly be defined as thermoplastic resins having an average molecular weight of 500 to 2000, which exhibit practically no reactivity with acids or bases. In actual practice, some acids are always present. Low levels of maleic acid anhydride, fatty acids, substituted phenol (antioxidants), sulphonated hydrocarbons and a large variety of acidic substances, including the oxidation products of hydrocarbon resins themselves may be present in hydrocarbon resins. The products may be viscous liquids barely pourable at room temperature but most commonly are supplied as flaked solids having a ring and ball softening point of 80° to 120° C. The polyterpene resins are hydrocarbon resins made by the polymerization of turpentine or some of the turpentine components such as beta-pinene or dipentene. Preferred hydrocarbon resins are the thermoplastic, relatively linear types of petroleum resins having a softening point between about 50° C. and 110° C., preferably between about 65° C. and 100° C.

One embodiment of the method of the invention comprises the addition of a compound which is a source of lithium ions, to a molten EVAc-based adhesive to provide lithium ions therein. Thus, for example, a typical hot-melt adhesive composition of petroleum wax, hydrocarbon tackifying resin and EVAc which has been observed to exhibit gel particle formation and viscosity increase during use may be improved by dusting into it a compound providing lithium ions. The proportion of compound dusted in may vary over a wide range. Advantageously, a sufficient proportion is used to provide the equivalent of at least 0.01 percent by weight of the adhesive composition of lithium metal. Preferably the equivalent of 0.005 to 1.0 percent is so provided. A larger proportion may be used, but serves no particular purpose. In this embodiment of the invention the lithium compound may be in powdered form for convenience and it may be added with mixing to an adhesive composition during melting or just after it has become molten rather than to a hot melt adhesive which may have been retained for some period of time in the molten state. In the latter instance, oxidative degradation has already been initiated and may be well advanced. Any lithium compound which will provide lithium ion is usable. Representative of such compounds are lithium hydroxide, lithium acetate, lithium carbonate, lithium salts of organic acids and the like. Admixture may be carried out with the assistance of conventional mixing apparatus.

In a preferred embodiment of the invention the inclusion of a reactive form of lithium in the EVAc-based adhesive is accomplished by providing the lithium ion as a salt of rosin or a rosin derivative. More specifically, rosin such as tall oil rosin, gum rosin, wood rosin and the like rosins or ester derivatives thereof commonly used as tackifiers in EVAc-based adhesive compositions may be reacted with a reactive form of lithium compound so that the lithium ion becomes a chemically combined part of the rosin or its ester. This form of lithium is preferred for supplying the lithium ion in the method of the invention. The term reactive form of lithium is understood to mean lithium hydroxide, lithium carbonate, lithium acetate and the like or any form of lithium capable of reacting under the process conditions used with the rosin acids or other organic acids present to form solubilized lithium soaps. The amount of lithium used in the preferred method of the invention may be such as to provide the equivalent of from 0.005 to 1.0% lithium metal ion in the modified rosin composition with 0.05% being approximately optimum. Larger proportions have no particular advantage but may be used.

It will be appreciated by those skilled in the art that all EVAc hot-melt adhesives should contain organic antioxidants such as the hindered phenolic compounds, triazine derivatives, substituted thiophenols and many other chemical types of which the hindered phenolic compounds are most commonly used. Their preparation and use are well known; see for example the disclosure of U.S. Pat. No. 3,873,466. A vast number of such compounds are commercially available and are selected by one familiar with the art for use in hot-melt adhesives on the basis of specific properties required in any particular end use of the adhesive such as resistance to migration into certain substrates, light color, cost, or whatever may be required. Such antioxidants remain desirable even though lithium is incorporated in the manner described above, but the effect of lithium is additive to that of the antioxidant. Any antioxidant known to provide a degree of protection for a particular hot-melt adhesive tackified with hydrocarbon resins will be markedly enhanced when lithium is used as described above in conjunction with it. The level of the antioxidant may also be significantly reduced to provide a level of protection previously established, but at lower cost. However, the presence of lithium ion alone, in the total absence of antioxidant compounds will not fully protect an EVAc based hot-melt adhesive against oxidative degradation.

The method of the invention also applies to molten mixtures of ethylene-vinyl acetate copolymer, a tackifier hydrocarbon resin and a diluent and the diluent consists of petroleum wax, microcrystalline wax or low molecular weight polyethylene, low molecular weight polypropylene or any mixture of these. The wide variety of ethylene vinyl acetate copolymers and diluent materials are well known; see U.S. Pat. Nos. 3,478,131 and 3,448,178.

It is an advantage of the present invention, whether practices as the preferred embodiment or practiced by mixing other compounds containing soluble lithium into the final adhesive composition, that it gives the hydrocarbon resin tackifiers a greater utility than they had previously. The method of the invention is not limited however to improvement of EVAc-based hot-melt adhesive compositions containing hydrocarbon resins as the sole tackifier component. Among tackifiers, the rosin ester tackifiers are notable for their ability to provide flexible bonds exhibiting high elongation, low temperature flexibility and light color at relatively low cost. The rosin esters, however, have been limited in their use due to their inability to prevent hot melt bodying or viscosity increase and skinning in EVAc adhesives, even with the most judicious selection of antioxidants. The application of the methods of the present invention will provide a higher degree of stability for hydrocarbon resin tackified, EVAc hot-melt adhesives which also include rosin ester tackifiers.

The following examples describe the manner and process of making and using the invention and set forth the best mode contemplated by the inventor but are not to be construed as limiting. All parts are by weight unless otherwise indicated.

EXAMPLE 1

(A) A suitable reaction flask is charged with 90.2 parts of melted tall oil rosin (Unitol NCY, Union Camp Corp.), 5.8 parts ethylene glycol. The charge is heated to a temperature of circa 275° C. with stirring under a nitrogen gas atmosphere until condensation proceeds to an acid number of about 65–70. To the resulting molten mixture there is added 0.2 parts butylated hydroxy toluene and 4.0 parts of lithium hydroxide monohydrate. The resulting mixture is maintained at a temperature of 270° C. until the acid number is in a range of 10 to 15. Then the mixture is cast in pans and allowed to cool to room temperature. The resulting resin has a ring and ball softening point at 81° C., a lithium metal content of 0.7 percent and a color (rosin cube) of N.

(B) To 5 parts of the resin prepared in (A) above there is added a mixture of 40 parts of ethylene-vinyl acetate copolymer (Elvax 250, E. I. DuPont), 20 parts paraffin wax (RO-855, Moore & Monger, Inc.) and 35 parts hydrocarbon resin (Wingtac 95; Goodyear Tire and Rubber Co.) The paraffin wax and Wingtac 95 are melt blended together in a 6½ by 10 cm steel beaker, then heated to 350° F. at which temperature Elvax 250 is added in small increments until it is all dissolved and blended smooth.

A 50 g initial sample of the resulting composition is poured out onto a piece of release paper and the beaker placed in a forced draft oven maintained at a temperature of 350° F. This beaker is probed and evaluated every 24 hours for a period of 96 hours for the development of skins on the surface and gels in the body of the compound. After 96 hours the hot adhesive is used to pour out a final 50 g sample. These samples are examined to evaluate the initial and final viscosity, color change (Gardner color at 50% solids in hot toluene) and grainy appearance or other significant change from the initial sample. The results are shown in TABLE 1, below.

TABLE 1

| Skinning (surface coverage, %) | |
|---|---|
| 24 hrs. at 350° F. | 2 |
| 48 hrs. at 350° F. | 2 |
| 72 hrs. at 350° F. | 2 |
| 96 hrs. at 350° F. | 2 |
| Initial Color (Gardner) | 3 |
| Final Color (Gardner) | 14 |
| Initial Viscosity (cps at 350° F.) | 5375 |
| Final Viscosity | 3600 |
| Viscosity Change | −33% |
| Final condition of melt | Opaque liquid, free of gels |

When applied as a molten film or bead, the mixture strongly bonds paper to paper, paper to aluminum foil and aluminum foil to steel.

EXAMPLE 2

This is not an example of the invention but is an example of a typical hydrocarbon resin tackified hot melt adhesive in which no antioxidants or lithium stabilizer were added during the blending of the adhesive components.

The procedure of Example 1, supra., is repeated except that the lithium hydroxide monohydrate and butylated hydroxy toluene are not added. Also the proportion of hydrocarbon resin is increased to 40 parts. The results of examination of the adhesive product are shown in Table 2, below.

TABLE 2

| Skinning (surface coverage, %) | |
|---|---|
| 24 hours at 350° F. | 10 |
| 48 hours at 350° F. | 25 |
| 72 hours at 350° F. | 25 |
| 96 hours at 350° F. | 25 |
| Initial color (Gardner) | 2 |
| Final color (Gardner) | 11+ |
| Initial viscosity (cps at 350° F.) | 5025 |
| Final Viscosity | 5200 |
| Viscosity change | +3 |
| Initial condition of melt | Clear and smooth |
| Final condition of melt | Opaque, dense mass of gel particles |

EXAMPLE 3

This is not an example of the invention but is an example of a typical hydrocarbon resin tackified hot melt adhesive which contains no lithium but does contain 0.2% antioxidant.

The procedure of Example 1, supra., is repeated except that no lithium hydroxide monohydrate is added. The results of examination of the final product is shown in Table 3, below

TABLE 3

| Skinning (surface coverage, %) | |
|---|---|
| 24 hrs at 350° F. | 2 |
| 48 hrs at 350° F. | 10 |
| 72 hrs at 350° F. | 20 |
| 96 hrs at 350° F. | 20 |
| Initial color (Gardner) | 3 |
| Final color (Gardner) | 11+ |
| Initial Viscosity (cps at 350° F.) | 4800 |
| Final Viscosity (cps at 350° F.) | 5375 |
| Viscosity change | +12% |
| Initial condition of melt | Clear and smooth |
| Final condition of melt | Opaque dispersion of large gels, similar to Example 2 but slightly less severe |

As shown in Table 3, in the composition of Example 3, the antioxidant provided only a slight over-all improvement. The greater viscosity increase is due to the fact that the compound was not as completely covered with skin as in Example 2.

EXAMPLE 4

Repeating the procedure of Example 1, supra., but omitting the addition of the butylated hydroxy toluene, a hot-melt adhesive composition is obtained, which upon examination shows the characteristics given in Table 4, below

TABLE 4

| Skinning (surface coverage, %) | |
|---|---|
| 24 hrs. at 350° F. | 100 (skin removed) |
| 48 hrs. at 350° F. | 50 |
| 72 hrs. at 350° F. | 50 |
| 96 hrs. at 350° F. | 50 |
| Initial color (Gardner) | 4+ |
| Final Color | 15 |
| Initial Viscosity (cps at 350° F.) | 6150 |
| Final Viscosity (cps at 350° F.) | 4525 |
| Viscosity Change | −26% |
| Final condition of melt | Opaque liquid, free of gels. Contains only a few particles of broken skin |

It will be seen from Table 4 that in the absence of an antioxidant, skinning and discoloration were worse than in Examples 2 and 3, but viscosity decreased rather than increased and gel particle formation is inhibited.

EXAMPLE 5

Repeating the procedure of Example 1, supra., but replacing the resin (A) as used in step (B) with an equal proportion of lithium hydroxide monohydrate, lithium acetate and lithium carbonate, respectively, hot-melt adhesive composition are obtained having improved molten stability.

EXAMPLE 6

Repeating the procedure of Example 1, supra., but replacing the resin (A) as used in step (B) with 2 parts of lithium hydroxystearate and using 38 parts Wingtac 95, a hot melt adhesive composition is obtained having improved molten stability.

What is claimed is:

1. A method of increasing the molten stability of ethylene-vinyl acetate copolymer hot-melt adhesive compositions containing hydrocarbon resin tackifier and at least one antioxidant compound, which comprises; mixing with said compositions a stabilizing proportion of a soluble lithium metal ion.

2. The method of claim 1 wherein said lithium metal ion is is provided in a lithium compound which is a salt of an organic acid.

3. The method of claim 2 wherein said salt is mixed with said compositions to provide the equivalent of from 0.005 to 1.0% by weight of the composition of lithium metal.

4. The method of claim 2 wherein the lithium compound is a reactive form of lithium such that it will form lithium salts with the organic acids already present in the adhesive composition.

5. The method of claim 1 wherein said lithium metal ion is provided in a rosin tackifier salt of lithium.

6. The method of claim 1 wherein said ion is derived from lithium hydroxide.

7. The method of claim 1 wherein said ion is derived from lithium acetate.

8. A hot-melt adhesive composition, which comprises an ethylene-vinyl acetate copolymer base, a hydrocarbon resin tackifier, at least one antioxidant compound and lithium metal ion.

9. The composition of claim 8 wherein the proportion of ion is from about 0.005 to about 1 part by weight.

* * * * *